Sept. 8, 1942.    W. G. WESSMAN    2,295,247
COMPENSATING INDEX
Filed Dec. 3, 1940

INVENTOR
WALTER G. WESSMAN
BY
ATTORNEY

Patented Sept. 8, 1942

2,295,247

UNITED STATES PATENT OFFICE 2,295,247

COMPENSATING INDEX

Walter G. Wessman, Bridgeport, Conn.

Application December 3, 1940, Serial No. 368,369

10 Claims. (Cl. 51—216)

This invention relates to new and useful improvements in machine tools and has particular relation to an improved structure of indexing means.

The objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

The present application is a continuation-in-part of my copending application Serial Number 317,000 filed February 2, 1940.

Figure 1:
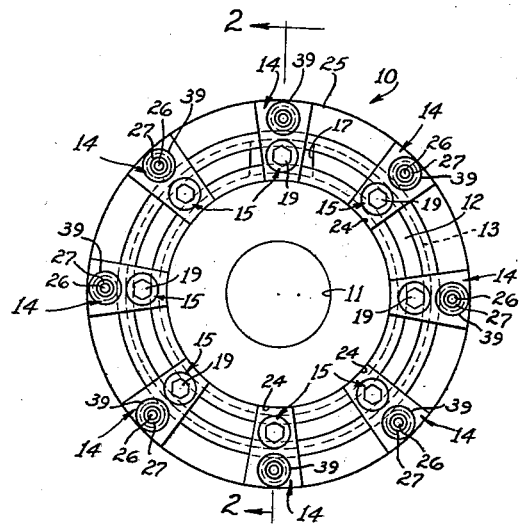
Fig. 1 is a front elevational view of the indexing means of the invention.
Figure 3:
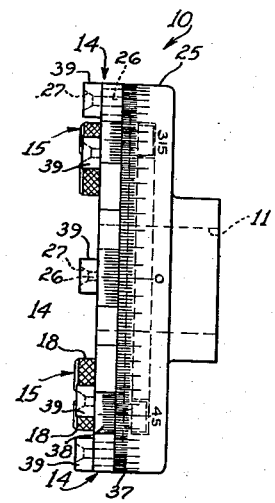
Fig. 3 is an edge elevational view of the indexing means of the invention.
Figure 2:
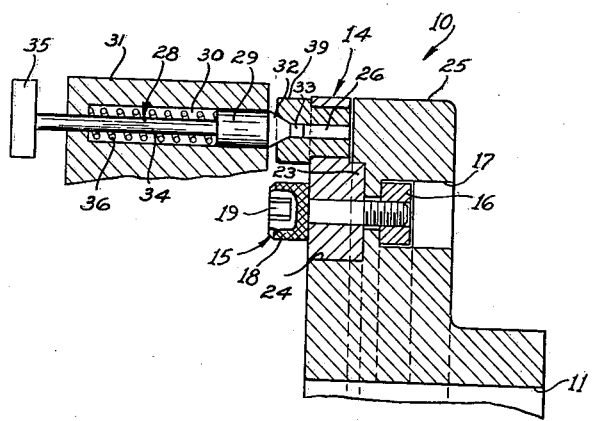
Fig. 2 is an enlarged vertical sectional view taken as along the plane of the line 2—2 of Fig. 1 with one of the locking pin engaging dogs omitted and showing the indexing disc in relation to a locking pin.
Figure 4:
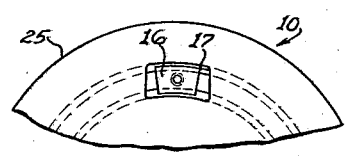
Fig. 4 is a rear elevational view of a portion of the indexing disc.

Referring in detail to the drawing my improved indexing means comprises a disc-like body or wheel generally designated 10 and including a hub portion having a centrally located opening 11 adapted to receive a shaft or the like on which the body may be mounted in any desired manner. Opening through the face of the body 10 is an annular slot 12 leading to an annular channel 13. The slot 12 and the channel 13 together form a T-shaped groove when the disc or body is viewed in transverse section as in Fig. 2.

Locking pin engaging dogs generally designated 14 are secured against the face of the body 10 by means of screws 15 passing through said dogs and the slot 12 and threaded into nuts or nut-like means 16 located in the channel 13. The parts 16 may be inserted into the channel through an opening 17 provided in the rear of the body for that purpose. Screws 15 include knurled heads 18 and each such head is provided with a socket 19 for a purpose to be described. Here it is observed that on loosening of a screw 15 such screw together with the dog 14 through which it is passing and the nut 16 to which it is threaded may be adjusted on the face of the body.

The slot 12 in the body opens forwardly into a recess 20 the inner and outer edges of which are defined by annular shoulders or surfaces 21 and 22 respectively. The dogs 14 are provided with off-set portions or extensions 23 disposed in said recess and when the screw 15 is tightened such extension is clamped against the inner or bottom face of the recess. Each dog has an arcuate surface 24 which is disposed against the annular shoulder 21 and such shoulder as well as the shoulder 22 and the outer peripheral edge 25 of the body 10 are all concentric with the mounting opening 11. The purpose of this arrangement will later appear.

Each dog is provided with a bushing 39 having a recess 26 opening through its front face and the forward portion of said recess is tapered as at 27. Any suitable locking pin 28 is adapted for cooperation with the recesses 26 of the various dogs for stopping and locking the disc 10 at the desired places depending on the predetermined setting of the dogs.

Such pin includes a body portion 29 slidably mounted in a recess 30 in a mounting block 31 and also includes a tapered portion 32 for seating against the tapered portion 27 of the recess 26. Forwardly of tapered portion 32 pin 28 includes a pilot portion 33 and rearwardly of the bearing or body portion 29 the pin includes a reduced diameter stem-like portion 34 on the outer end of which is a finger piece 35 by means of which the pin may be retracted in opposition to a coil spring 36 disposed about the shank portion of the pin.

As will be understood the locking pin 28 is located to enter the recess 26 of each dog 14 as the body 10 is rotated to bring each such recess into alignment with the pin. On its outer peripheral edge body 10 is provided with a scale 37 representing degrees and the entire peripheral edge of the body is graduated. The outer end of each dog 14 is flush or substantially with the peripheral surface 25 of the body 10 and is provided with vernier markings 38 to be read in conjunction with the scale on the body 10.

The arrangement is such that the locking pin receiving recesses 26 of the dogs are always in a radial center line of the body 10 and since the dogs at their inner ends are always in contact with the shoulder 24 and the latter is concentric with the mounting of the body the locking pin receiving recesses 26 are the same distance from the axial center of the body in any position in which the dogs may be adjusted. It will be apparent that on loosening of the screws 15 the dogs may be adjusted to the desired positions relative to one another and accurately positioned by use of the vernier markings 38 in connection with the scale 37.

Any desired number of dogs 14 may be used depending on the work to be performed. The index of the invention is adapted for use in layout machines, milling machines, grinding machines and the like although at the present time I find it particularly useful as an indexing means for a tool grinder when grinding tools the flutes of which are not all the same distance apart.

The bushings 39 are for use as buttons and are rigid with the respective dogs. Each bushing includes a portion of less diameter having a drive fit into a suitable opening in its dog and an outer portion of larger diameter projecting beyond the forward face of its dog. The shoulder at the juncture of such portions limits insertion of the bushing into the dog. Each bushing has its projecting portion hardened, ground and lapped and such portion need only project forward of the dog sufficient to be engaged by a micrometer.

In addition to providing the sockets or recesses 26 for the locking pin the bushings 39 comprise means used in precision setting of the dogs. For most work the vernier readings are sufficiently accurate. However, when greater accuracy is required for any particular work the adjustments may be checked or may be determined by placing a micrometer over a pair of the bushings, engaging their outer sides, and when the pair of dogs are thus located and set the micrometer may be placed across the bushing of one set dog and over the bushing of the next adjacent dog to properly locate the latter. This process is repeated until all the dogs are properly located relatively.

Having thus set forth the nature of my invention, what I claim is:

1. A compensating indexing means comprising a hub portion to be secured to a shaft or spindle, a disc-like body projecting radially beyond said hub portion, an annular transversely substantially T-shaped slot opening through one face only of said body, a nut in said slot and movable along the same, a dog on the face of the body and having an index locking pin receiving recess therein, and a screw passing through said dog and into said nut and adapted to be tightened to secure the dog in the desired position on the face of the body.

2. A compensating indexing wheel comprising a disc-like body having a centrally located mounting, said body having an annular recess and an annular slot opening into said recess, a dog on said body and including a portion fitting in said recess, a nut at the rear side of said slot, a screw passing through said dog and threaded to said nut whereby on tightening of the screw the dog is clamped to the body, said recess including an edge concentric with said mounting, said dog including a portion bearing on said edge portion whereby in any position of the dog about said annular slot the dog is concentric with the mounting, and said dog having a recess adapted to be engaged by an indexing locking pin.

3. A compensating indexing means comprising a disc-like body adapted to be mounted on a shaft or the like, index locking pin engaging dogs on one face of said body and individually adjustable thereon, means to secure said dogs to the body in the desired adjusted positions of the dogs, and each of said dogs having an index locking pin receiving recess therein.

4. A compensating indexing means comprising a disc-like body having a centrally located mounting portion concentric with its outer peripheral edge, index locking pin engaging blocks on a face of said body and individually adjustable thereon, said blocks having their outer edges substantially flush with the peripheral edge of the body, means for guiding adjustment of said blocks on said body whereby to maintain the blocks in concentric relation to said mounting portion and said peripheral edge, means releasably securing the blocks to the body in adjusted positions of the blocks, said body marked off in degrees about its peripheral edge, and vernier markings on the outer edges of the blocks to be read in connection with the markings on the body.

5. A compensating indexing means comprising a disc-like body having a centrally located mounting portion concentric with its outer peripheral edge, index locking pin engaging dogs on a face of said body and individually adjustable thereon, means for guiding adjustment of said dogs on said body whereby to maintain the dogs in concentric relation to said mounting portion and said peripheral edge, means releasably securing the dogs to the body in adjusted positions of the dogs, said body marked off in degrees about its peripheral edge, and said dogs having their outer ends substantially flush with the peripheral edge of said body for easy and accurate location of the dogs in accordance with selected degree marks on the periphery of the body.

6. A compensating indexing wheel comprising a central mounting portion, an annular shoulder concentric with the axial center of said mounting portion, index locking pin engaging dogs on a face of said body and individually adjustable thereon, each of said dogs including an arcuate inner end concentric with and bearing on said shoulder whereby the dogs are concentrically located relative to the axial center of said mounting portion of the body, means for securing the dogs to the body in adjusted positions of the dogs, and each of said dogs having an index locking pin receiving recess therein.

7. A compensating indexing means comprising a body adapted to be mounted on a shaft or the like, index locking pin engaging dogs on one face of said body and individually adjustable thereon, means to secure the dogs to the body in the desired adjusted positions of the dogs, and buttons projecting from uniform and fixed locations on said dogs for engagement by a micrometer for determining adjustments of the dogs relatively.

8. A compensating indexing means comprising a body adapted to be mounted on a shaft or the like, index locking pin engaging dogs on one face of said body and individually adjustable thereon, means to secure the dogs to the body in the desired adjusted positions of the dogs, projections on the faces of said dogs for engagement by a micrometer in determining settings of the dogs, and each of said projections having an opening in its outer end for the entrance of a locking pin.

9. A compensating index comprising a disc-like body having a centrally located mounting, said body having an annular recess and an annular slot opening into said recess, a dog on said body and including a portion fitting in said recess, means movable along said slot for clamping the dog to the body, said recess including an edge concentric with said mounting, said dog including a portion bearing on said edge portion whereby in any position of the dog about said annular slot the dog is concentric with the mounting, and said dog having a recess adapted to be engaged by an indexing locking pin.

10. A compensating index comprising a disc-like body having a centrally located mounting, said body having an annular slot opening through a side thereof, an annular shoulder on said side of the body and spaced from said slot and concentric with said centrally located mounting, a dog on said side of the body, means movable along said slot for clamping the dog to the body, said dog including a radially facing portion bearing on said shoulder whereby said dog is maintained concentric with said centrally located mounting, and said dog having a recess adapted to be engaged by an index locking pin.

WALTER G. WESSMAN.